UNITED STATES PATENT OFFICE.

WALTER H. DICKERSON, OF MUSKEGON, MICHIGAN.

METHOD OF TREATING LIQUORS CONTAINING SULFUROUS ACID OR SULFITES.

1,059,716. Specification of Letters Patent. Patented Apr. 22, 1913.

No Drawing. Application filed August 24, 1909. Serial No. 514,374.

*To all whom it may concern:*

Be it known that I, WALTER H. DICKERSON, a citizen of the United States of America, residing at Muskegon, in the county of Muskegon and State of Michigan, have invented certain new and useful Improvements in Methods of Treating Liquors Containing Sulfurous Acid or Sulfites, of which the following is a specification.

My invention relates to the utilization of waste sulfite liquors resulting from the manufacture of cellulose by the sulfite process, and particularly to that portion of the treatment and purification of these liquors which is concerned with their concentration by evaporation either at normal pressures or *in vacuo*. It is known that these waste sulfite liquors contain varying amounts of high molecular complexes as well as tannins, gums, sugars, etc., all of which organic constituents are derived from the incrusting materials of the wood, and the breaking down of the lignocellulose thereof, during the sulfite treatment. These liquors contain, moreover, various inorganic substances, mostly in solution. They are mainly compounds of calcium or magnesium with sulfurous acid, such as calcium bisulfite or calcium sulfite. This acid is usually in excess so that some of it exists as free, uncombined acid, and also as gas in a state of solution. At higher temperatures such as those attained during the concentration of these liquors, the valuable organic constituents thereof decompose with considerable rapidity if the liquors contain any considerable amount of free acid. They decompose also with equal if not greater rapidity while alkaline. In order to prevent these decompositions as much as possible, it is advantageous to concentrate the liquors while they are weakly acid, in which state there seems to be a minimum of decomposition. If, however, as is sometimes the case, any considerable proportion of sulfuric acid is formed during the evaporation of the liquors while acid, they undergo a marked decomposition which renders them unfit for many purposes. I have found that the liberation of free sulfuric acid in the liquors, even if in very small proportions at first, seems to have an autocatalytic influence, in that it leads to the further formation of this or other acids whereby the acidity of the solution rapidly increases accompanied by correspondingly accelerated decompositions. Under these conditions the liquors quickly become "burned" as it has been termed, and thereby lose much of their value for most purposes. I have found that these deleterious decompositions during the treatment of waste sulfite liquors, due to the formation or liberation of sulfuric acid, may be prevented by having basic constituents in the solution to combine with and remove the sulfuric acid in the form of insoluble sulfates. Such basic constituents are barium or calcium, both of which combine with sulfuric acid and precipitate in insoluble form in acid solution. If a barium salt is relied upon to effect the removal of sulfuric acid as it is formed, it may be added in the form of the solid, barium carbonate, etc., or in solution in water, as for example a solution of barium chlorid. I have found, however, that the addition of extraneous compounds such as these, to precipitate sulfuric acid, is usually not necessary, but that the same effect is attained by allowing sufficient calcium salts to remain in weakly acid liquors during their evaporation. Waste sulfite liquors almost invariably contain considerable amounts of calcium in solution as is well known. It has previously been customary to remove all of this by precipitation as an insoluble salt before the concentration of the liquor by evaporation. The only alternative to this practice, so far as I am aware, has been the addition to the liquors of soluble alkaline compounds in excess in order to completely neutralize the free acid. Neither of these methods of procedure prevents the decompositions which it is the object of my invention to obviate. In the first instance, all the lime salts are removed; in the second instance, there may be an excess of lime in the liquors, but the decompositions which result in the formation of sulfuric acid, do not then occur, but rather others, which are, as I have said, equally deleterious. In order, therefore, to effect the concentration of waste sulfite liquors which contain calcium, I so treat them,—either after their discharge from the digester or after any subsequent treatment that might be found desirable,— that they remain weakly acid and contain a sufficient amount of dissolved calcium salts to combine with and precipitate all sulfuric acid which may be liberated or formed during the evaporation of the liquors. For example, if oxalic, phosphoric, sulfuric or other acids which form insoluble calcium compounds are added to the liquors before their concentration, I make these additions only in such quantities as will leave in solution a suitable slight proportion of unprecipitated calcium salts. The quantity of calcium which I thus retain in solution during evaporation can be quite small because the total amount of sulfuric acid formed during the concentration is very small, as long as this acid is removed practically as fast as it is formed. It is only, as I have said, in the case of its accumulation unhindered in the liquors that considerable quantities of it are formed, and the aforesaid decomposition of the liquors occurs. In the presence of suitable basic constituents such as barium or calcium, these aforesaid decompositions and the formation of any considerable quantities of sulfuric acid does not occur, and the liquors may be safely concentrated either at normal pressures or *in vacuo*, or further treated. Where it is desirable any calcium, barium salts, etc., remaining in solution, at the termination of concentration or further treatment, may be finally precipitated by the addition of suitable salts or acids with which these basic constituents form insoluble compounds.

While this method of purifying liquors and preventing decompositions has been applied by me mainly with reference to waste sulfite liquors obtained from the manufacture of cellulose, it may, nevertheless, be advantageously used with any liquors, containing valuable products and sulfurous acid or sulfites, in which decomposition of the valuable products would occur by the formation of sulfuric acid, even in small amounts, during the concentration or other treatment of the liquors.

Having thus described my invention, what I claim as new and desire to secure by Letters Patent, is:

1. The method of preventing decomposition of waste sulfite liquors during concentration thereof which consists in precipitating part of the basic constituents which form insoluble precipitates with sulfuric acid, and then concentrating the liquors while they are acid.

2. The method of preventing decomposition of waste sulfite liquors during concentration thereof which consists in precipitating part of the basic constituents which form insoluble precipitates with sulfuric acid, and then concentrating the liquors while they are weakly acid.

3. The method of preventing decomposition of products obtained from waste sulfite liquors during concentration thereof which consists in precipitating part of the basic constituents which form insoluble precipitates with sulfuric acid, and then concentrating the liquors while they are acid.

4. The method of preventing decomposition of products obtained from waste sulfite liquors during concentration thereof which consists in precipitating part of the basic constituents which form insoluble precipitates with sulfuric acid, and then concentrating the liquors while they are weakly acid.

5. The method of preventing decomposition of waste sulfite liquors during concentration thereof which consists in concentrating them while they are acid and contain soluble barium compounds.

6. The method of preventing decomposition of products obtained from waste sulfite liquors during concentration thereof which consists in concentrating them while they are acid and contain soluble barium compounds.

In testimony whereof I affix my signature in presence of two witnesses.

WALTER H. DICKERSON.

Witnesses:
 JEANNETTE STORK,
 A. L. KENT.